(12) United States Patent
Heitzmann et al.

(10) Patent No.: US 11,701,930 B2
(45) Date of Patent: Jul. 18, 2023

(54) TRAILER COUPLER ASSEMBLIES AND RELATED METHODS

(71) Applicant: MORRYDE INTERNATIONAL, INC., Elkhart, IN (US)

(72) Inventors: David E. Heitzmann, Union, MI (US); Brian Opfer, Dowagiac, MI (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 0 days.

(21) Appl. No.: 17/670,184

(22) Filed: Feb. 11, 2022

(65) Prior Publication Data

US 2022/0258549 A1 Aug. 18, 2022

Related U.S. Application Data

(60) Provisional application No. 63/148,984, filed on Feb. 12, 2021.

(51) Int. Cl.
| | |
|---|---|
| *B60D 1/06* | (2006.01) |
| *B60D 1/58* | (2006.01) |
| *B60D 1/56* | (2006.01) |
| *B60D 1/145* | (2006.01) |

(52) U.S. Cl.
CPC .............. *B60D 1/06* (2013.01); *B60D 1/145* (2013.01); *B60D 1/56* (2013.01); *B60D 1/583* (2013.01)

(58) Field of Classification Search
CPC .................................. B60D 1/06; B60D 1/167
See application file for complete search history.

(56) References Cited

U.S. PATENT DOCUMENTS

| | | | | |
|---|---|---|---|---|
| 4,125,272 A | * | 11/1978 | Putnam, Jr. .............. | B60D 1/40 280/479.3 |
| 4,194,755 A | * | 3/1980 | Youngblood ........... | B60P 3/125 280/402 |
| 4,198,073 A | * | 4/1980 | Olsen ..................... | B60D 1/247 280/455.1 |
| 4,722,542 A | * | 2/1988 | Hensley ................. | B60D 1/345 280/456.1 |
| 5,277,447 A | * | 1/1994 | Blaser ..................... | B60D 1/40 280/479.2 |
| 6,485,046 B1 | * | 11/2002 | Hsueh ..................... | B60D 1/34 280/455.1 |
| 7,422,226 B2 | * | 9/2008 | Hsueh ..................... | B60D 1/32 280/455.1 |
| 10,875,369 B2 | * | 12/2020 | Gabriel .................... | B60D 1/44 |
| 11,491,834 B1 | * | 11/2022 | Gabriel .................. | B60D 1/075 |

* cited by examiner

*Primary Examiner* — Kevin Hurley

(74) *Attorney, Agent, or Firm* — Marshall, Gerstein & Borun LLP

(57) ABSTRACT

A trailer coupler assembly and methods of use are provided that includes a ball coupler, a rod member having a first end and an opposite second end, a trailer frame, a first pivot connection pivotably connecting the first end of the rod member to the ball coupler, such that the rod member can rotate within a vertical plane relative to the ball coupler, and a second pivot connection pivotably connecting the rod member to the trailer frame, such the trailer frame can rotate around the rod member. The trailer coupler assembly also includes a lock out member that is configured to releasably engage the first pivot connection to thereby restrict pivoting of the rod member relative to the ball coupler.

31 Claims, 13 Drawing Sheets

TRAILER COUPLER ASSEMBLIES AND RELATED METHODS

CROSS-REFERENCE TO RELATED APPLICATION

This application claims the priority benefit of U.S. Provisional Application No. 63/148,984, filed Feb. 12, 2021, which is hereby incorporated by reference in its entirety.

FIELD OF THE DISCLOSURE

The present disclosure generally relates to trailer coupler assemblies.

BACKGROUND

In some instances, trailers can require or benefit from greater articulation between the trailer and the towing vehicle. Available coupler assemblies providing such articulation often require non-standard connections between the trailer and the hitch of the towing vehicle. These non-standard connections can create issues for dealers, transportation companies, and even end users, who would be required to have a different coupling to be able to use the trailer.

SUMMARY

In accordance with a first aspect, a trailer coupler assembly is disclosed that includes a ball coupler, a rod member having a first end and an opposite second end, a trailer frame, a first pivot connection pivotably connecting the first end of the rod member to the ball coupler, such that the rod member can rotate within a vertical plane relative to the ball coupler, and a second pivot connection pivotably connecting the rod member to the trailer frame, such the trailer frame can rotate around the rod member. The trailer coupler assembly further includes a lock out member configured to releasably engage the first pivot connection to thereby restrict pivoting of the rod member relative to the ball coupler.

In some forms, the ball coupler can include a rear wall and side walls extending away from edges of the rear wall and the first pivot connection can include a pin extending between the side walls and through the first end of the rod member. In these forms, the lock out member can include a lock bar configured to be selectively inserted through the side walls of the ball coupler and the first end of the rod member or a lock wall configured to be removably inserted between an end surface of the first end of the rod member and the rear wall of the ball coupler.

In further forms, the trailer coupler assembly can include one or more of the following aspects: the lock bar can be a bolt and nut configured to be selectively inserted through aligned bores of the side walls of the ball coupler and the first end of the rod member; the rod member can include a cylindrical body and the first end of the rod member can include one or more walls extending outwardly from the cylindrical body, e.g., two wall disposed on opposite sides of the cylindrical body of the rod member, where the lock bar is configured to be selectively inserted through the side walls of the ball coupler and the one or more walls of the first end of the rod member; the side walls of the ball coupler can define a slot opening therein, so that the lock bar is configured to shift within the slot opening to allow the rod member to pivot relative to the ball coupler about the first pivot connection; and/or the ball coupler can include a storage connector for the lock bar when not engaged in the first pivot connection.

In further forms, the trailer coupler assembly can include one or more of the following aspects: the lock wall can have a tapered configuration to be press fit between the end surface of the first end of the rod member and the rear wall of the ball coupler, a top edge of the first end of the rod member can have a beveled configuration, or an end portion of the first end of the rod member can have a rectangular configuration.

In other forms, the lock out member can include a top wall extending transversely from the lock wall to be disposed over the rod member when the lock out member releasably engages the first pivot connection. If desired, the top wall and the rod member can include bores configured to align with the lock out member engaging the first pivot connection; and the assembly can include a fastener configured to be threaded into the bores to thereby secure the lock out member to the rod member. In further forms, the top wall can include a second bore not aligned with a bore in the rod member, such that inserting a fastener through the second bore causes the wall to release from between the end surface of the first end of the rod member and the rear wall of the ball coupler.

In some forms, the trailer coupler assembly can include a mount, a ball hitch coupled to the mount, and a restrictor plate configured to be removably coupled to the mount below the ball hitch, the restrictor plate configured to restrict vertical movement of the ball coupler relative to the ball hitch when the ball coupler is coupled thereto.

In some forms, the ball coupler can include a latch mechanism that is configured to selectively be disposed below a bottom surface of the restrictor plate when the lock bar is not engaged in the first pivot connection to thereby restrict upward rotation of the ball coupler relative to the restrictor plate. For example, the latch mechanism can include a latch member pivotably mounted between the side walls of the ball coupler.

In other forms, the rear wall and lock wall can include downwardly depending portions having bores extending therethrough, the bores configured to align with the lock out member engaging the first pivot connection and receive a fastener therethrough to secure the lock out member to the rear wall. In further forms, the bore of the downwardly depending portion of the rear wall can be configured to align with the restrictor plate when the restrictor plate is coupled to the mount and the ball coupler is coupled to the ball hitch, and is sized to prevent the fastener from be inserted through the bores of the downwardly depending portions. Additionally, a rear edge of the restrictor plate can have a curved configuration complementary to an arc of rotation of the downwardly depending portion of the rear wall.

In accordance with a second aspect, a method for operating a trailer coupler assembly having any of the above configurations is disclosed. The method includes coupling the ball coupler to a ball hitch of a towing vehicle and engaging the first pivot connection with a lock out member to thereby restrict pivoting of the rod member relative to the ball coupler.

In some forms, engaging the first pivot connection with the lock member can include inserting a lock bar through the ball coupler and the first end of the rod member; or inserting a lock wall of the lock out member between the rod member and a rear wall of the ball coupler. The method can also include securing a top wall of the lock out member to the rod member using one or more fasteners and, if desired, releasing the lock wall from between the rod member and the rear wall of the ball coupler by threading a fastener through a bore of the top wall to abut the rod member. In other forms, the method can include securing the lock wall to the rear wall of the ball coupler with a fastener.

In some forms, the method can include disengaging the lock out member from the first pivot connection and securing a restrictor plate to a mount below a ball hitch coupled thereto, the restrictor plate configured to restrict vertical movement of the ball coupler when the ball coupler is coupled to the ball hitch. In further forms, the method can include disposing a portion of a latch member of the ball coupler below the restrictor plate to thereby restrict upward rotation of the ball coupler relative to the restrictor plate.

DETAILED DESCRIPTION

Trailer coupler assemblies are provided herein with first and second pivot connections along with a ball coupler to provide articulation in multiple planes while using a standard ball hitch. The trailer coupler assemblies have a first mode of operation restricting the first pivot connection and a second mode of operation providing free movement of the first and second pivot connections. In some forms, the second mode of operation can also restrict vertical movement of the ball coupler relative to the ball hitch while allowing free movement in the first and second pivot connections.

Figure 13:
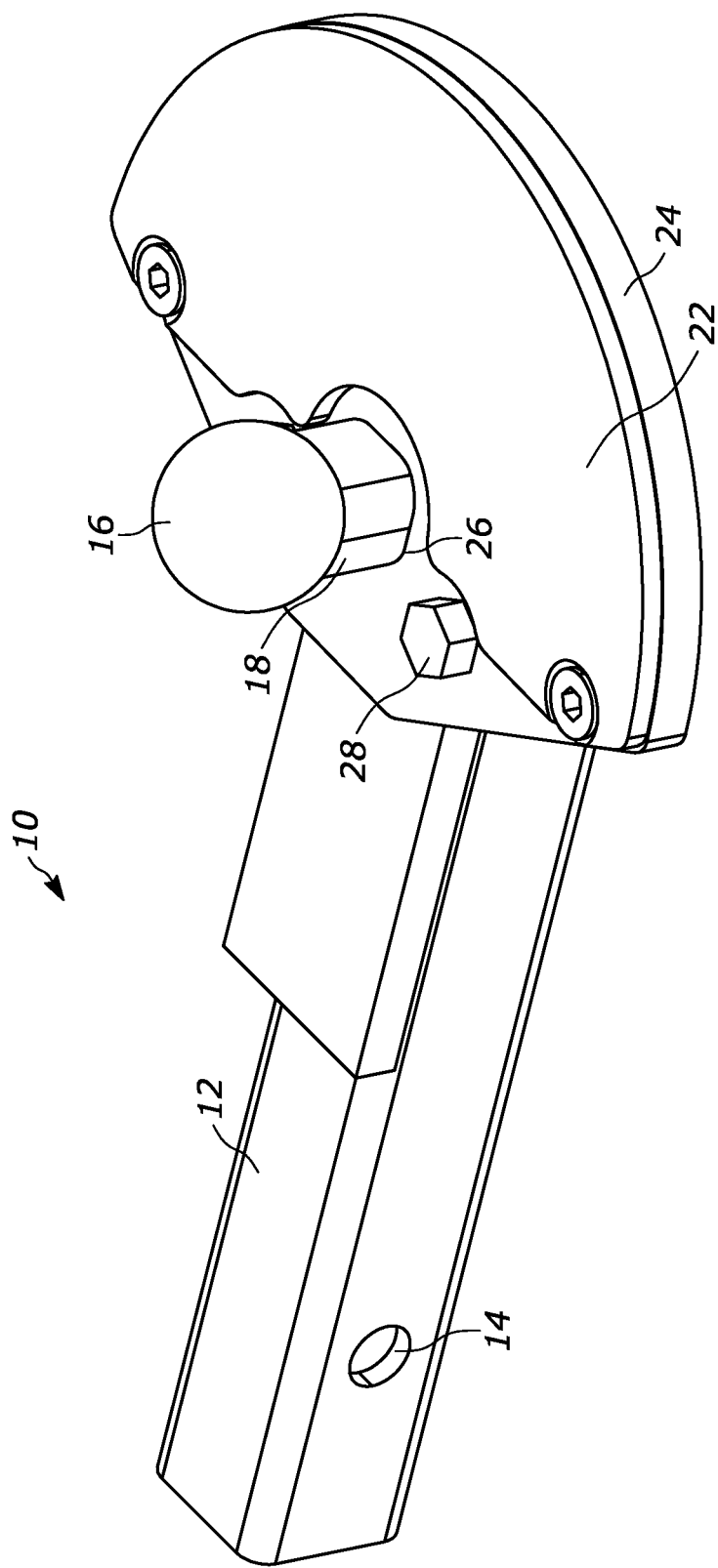
FIG. 13 is a perspective view of a ball hitch and mount with a restrictor plate coupled thereto in accordance with various embodiments.

The trailer coupler assemblies described herein are suitable for use with a standard ball hitch 10 as shown in FIG. 13, which can include a mount 12 configured to be secured to a towing vehicle (not shown). For example, the mount 12 can include an opening 14 extending therethrough for a hitch pin to releasably secure the mount 12 to the towing vehicle. As shown, the ball hitch 10 includes a ball 16 and a downwardly depending shaft 18. In one form, the ball hitch 10 can be removably secured to the mount 12 by threading a nut 20 to the shaft 18 on an opposite side of the mount 12 from the ball 16. It will be understood that the ball hitch 10 can be provided as a component of the trailer coupler assemblies described below or can be used in combination and/or retrofit to couple to the trailer coupler assemblies described below.

Details of example trailer coupler assemblies 100 are shown in FIGS. 1-12. The trailer coupler assembly 100 of these forms includes a ball coupler 102, a rod member 104 having a first end 106 and an opposite second end 108, and a trailer frame 110. The trailer coupler assembly 100 is movable about the connection between the ball coupler 102 and the ball hitch 10, about a first pivot connection 112 pivotably connecting the first end 106 of the rod member 104 to the ball coupler 102 and a second pivot connection 114 pivotably connecting the second end 108 of the rod member 104 to the trailer frame 110. If desired, in some forms, the ball coupler 102 can include a handle 15 rigidly mounted or secured thereto to aid a user in attaching the ball coupler 102 to the ball hitch 10 or a spring-biased securing mechanism 17 coupled thereto to releasably secure the ball coupler 102 to the ball hitch 10.

The first pivot connection 112 is configured to allow the rod member 104 to rotate within a vertical plane relative to the ball coupler 102 about a horizontal pivot axis P1. In one form, the first pivot connection 112 can include a pin 116 that extends through a portion of the ball coupler 102 and the first end 106 of the rod member 104 along the pivot axis P1. For example, the ball coupler 102 can include a hood portion 118 configured to engage the ball hitch 10 and a bracket 120 coupled to an end 122 of the hood portion 118. As shown, the bracket 120 includes a rear wall 124 and opposing side walls 126 extending from edges of the rear wall 124. So configured, bores 128 extending through the side walls 126 and the rod member first end 106 can be aligned and the pin 116 can be inserted therethrough to pivotably coupled the rod member 104 to the ball coupler 102. The pin 116 can be secured to the assembly 100 by any suitable method, such as by a nut, welding, etc.

The second pivot connection 114 is configured to allow the trailer frame 110 to rotate around the second end 108 of the rod member 104 about a pivot axis P2 extending longitudinally through the rod member 104. In one form, the second end 108 of the rod member 104 can extend at least partially through a portion of the trailer frame 110 allowing the trailer frame 110 to rotate around the rod member 104.

An example configuration for the second pivot connection 114 is shown in FIGS. 4, 7, 8, 11, and 12. In these forms, the second end 108 of the rod member 104 has a cylindrical configuration and the trailer frame 110 forms a bore 130 sized to receive the rod member 104 therein. To secure the rod member 104 to the trailer frame 110, the rod member 104 can extend to or through an end of the bore 130 and a stop member 132 having greater dimensions than the bore 130 can be secured to a distal end 134 thereof by any suitable mechanism, such as by a fastener and nut 136, welding, and so forth. The stop member 132 prevents the rod member 104 from being pulled through the bore 130, while also allowing the rod member 104 to rotate within the bore 130. If desired, the assembly can further include a spacer 138 disposed between the stop member 132 and the trailer frame 110. The spacer 138 can be configured to allow easy rotation of the rod member 104 and, optionally, the stop member 132 relative to the trailer frame 110. For example, the spacer 138 can be made from a low friction material, can include a bearing, and so forth.

As shown, the rod member 104 can further include a second stop member 140 having greater dimensions than the bore 130 secured to an intermediate portion thereof to be disposed adjacent to the opposite end of the bore 130 from the first stop member 132. The second stop member 140 can be integrally formed with the rod member, welded thereto, or be secured thereto with other suitable securing mechanisms. The second stop member 140 prevents the rod member 104 from being pushed through the bore 130, while also allowing the rod member 104 to rotate within the bore 130. If desired, the assembly can further include a second spacer 142 disposed between the second stop member 140 and the trailer frame 110. The second spacer 142 can be configured to allow easy rotation of the rod member 104 and, optionally, the second stop member 140 relative to the trailer frame 110. For example, the second spacer 142 can be made from a low friction material, can include a bearing, and so forth.

If desired, the bore 130 can be formed by a cylindrical tube 144 extending within a housing 146 secured to frame members 148 of the trailer frame 110 as shown. In the illustrated form, the frame members 148 form a pointed end with inwardly angled side frame members 150 and a cross-frame member 152 extending therebetween. The housing 146 can be formed from one or more plates that secure to the frame members 148 and/or to each other by any suitable mechanism, such as bolts or other fasteners, welding, etc., to secure the tube 144 in place and provide support for the tube 144 during use of the assembly 100. For example, the housing 146 can include a top plate 154, side plates 156, a bottom plate 158 and two internal bracing plates 159 extending between the top and bottom plates 154, 158 on either side of the tube 144. The bracing plates 159 can secure to and/or interlock with the top plate 154, the bottom plate 158 and/or one or more of the frame members 148, as desired to provide sufficient bracing during use.

In the illustrated forms, the stop members 132, 140 and spacers 138, 142 have annular, ring-shaped configurations to receive the rod member 104 and/or the fastener 136 therethrough. Additionally, the stop members 132, 140 and spacers 138, 142 can have a diameter equal to or smaller than a height of the housing 146 so that they do not extend above and below the housing 146.

In order to convert the trailer coupler assembly 100 to the first mode of operation and as shown in FIGS. 1, 3, 5, 7, 9, and 11, a lock out member 160 can be removably coupled to the first pivot connection 112 to thereby restrict rotation of the rod member 104 relative to the ball coupler 102 about the pivot axis P1. In one form, as shown in FIGS. 1-8, the lock out member 160 can include a lock wall 162 configured to engage both the rod member 106 and the ball coupler 102 to restrict movement of the components relative to one another. For example, the lock wall 162 can be configured to be removably inserted between the rod member first end 106 and the ball coupler 102. As shown, an end surface 164 of the rod member first end 106 and the rear wall 124 of the bracket 120 can have at least partially planar configurations configured to be engaged by the lock wall 162. Further, the lock wall 162 can have a thickness corresponding to a distance that the end surface 164 and the rear wall 124 are spaced apart from one another when generally parallel to one another, e.g., with the trailer assembly 100 aligned along a plane. For example, the lock wall 162 can be press fit between the end surface 164 and the rear wall 124 to restrict rotation of the rod member 104. In order to help with assembly and prevent the lock out member 160 from falling through the assembly 100, the lock out member 160 can include a top wall 166 that extends transversely from a top edge of the lock wall 162 to extend away from the bracket rear wall 124 and project over the rod member first end 106. With this configuration, the top wall 166 can abut the rod member 104 if the lock wall 162 is fully inserted into the first pivot connection 112.

In some forms, the lock wall 162 can have a tapered configuration, such that the thickness of the lock wall 162 increases along the height thereof. In some examples, a rear surface 168 and/or a front surface 170 can have an outwardly angled configuration relative to vertical. With this configuration, the lock wall 162 can be easily inserted into the first pivot connection 112 with a thickness at a bottom thereof that is smaller than the distance between the end surface 164 of the rod member first end 106 and the rear wall 124 and advanced into the first pivot connection 112 until the thickness of the lock wall 162 becomes larger than the distance between the end surface 164 and the rear wall 124. This achieves a press fit configuration that can reliably restrict rotation of the first pivot connection 112 despite any potential wear from use. Of course, one or both of the rear wall 124 and the end surface 164 of the rod member first 106 could alternatively or additionally have a tapered configuration to achieve a similar press-fit configuration with the lock wall 162.

The lock out member 160 and the first pivot connection 112 can have any suitable form. In a first example form shown in FIGS. 1-4, the rod member first end 106 can have a rectangular configuration such that the end surface 164 has a footprint corresponding to a footprint of the lock wall 162 to maximize the engagement therebetween. To achieve a desired size and shape, the rod member first end 106 can include an engagement wall 172 providing the end surface 164 that extends above and/or below a cylindrical main portion 174 of the rod member 104. Moreover, if desired, a top edge 176 of the rod member first end 106, such as the engagement wall 172, can have a beveled or curved configuration to ease the insertion of the lock wall 162 into the first pivot connection 112. As shown, a bottom edge 177 of the rod member first end 106 can also have a beveled or curved configuration. The beveled edges 176, 177 can be utilized to provide clearance for articulation of the rod member first end 106 during use of the trailer coupler assembly 100, for example.

To secure the lock out member 160 to the first pivot connection 112, the top wall 166 and the rod member first end 106 can include one or more bores 178, 180 that are configured to align with the lock wall 162 inserted into the first pivot connection 112. Thereafter, a user can thread bolts or other fasteners 182 into the bores 178, 180 to thereby secure the lock out member 160 to the rod member 104. Further, the bolts 182 can be used to advance the lock wall 162 into the first pivot connection 112, which can help ensure a maximum surface area engagement between the lock wall 162 and the bracket rear wall 124/rod member end surface 164, particularly with forms having a tapered lock wall 162 configuration. If desired, as shown, at least a portion of a top surface 184 of the rod member first end 106 can have a planar configuration to aid in engagement between the components.

In a further form, the top wall 166 can include one or more secondary bores 186 that are aligned with an unbroken surface of the rod member 104, e.g., not aligned with a bore therein, such that a bolt or other fastener can be threaded through the secondary bore 186 to engage the rod member 104. This can be utilized to release the lock wall 162 from the first pivot connection 112 as the bolt is advanced through the secondary bore 186. For example, the bores 178 and the secondary bore 186 can have a common diameter, such that one of the bolts 182 used to secure the lock out member 160 to the rod member 104 can then be used to release the lock wall 162 from the between the end surface 164 of the rod member first end 106 and the bracket rear wall 124.

Figure 1:
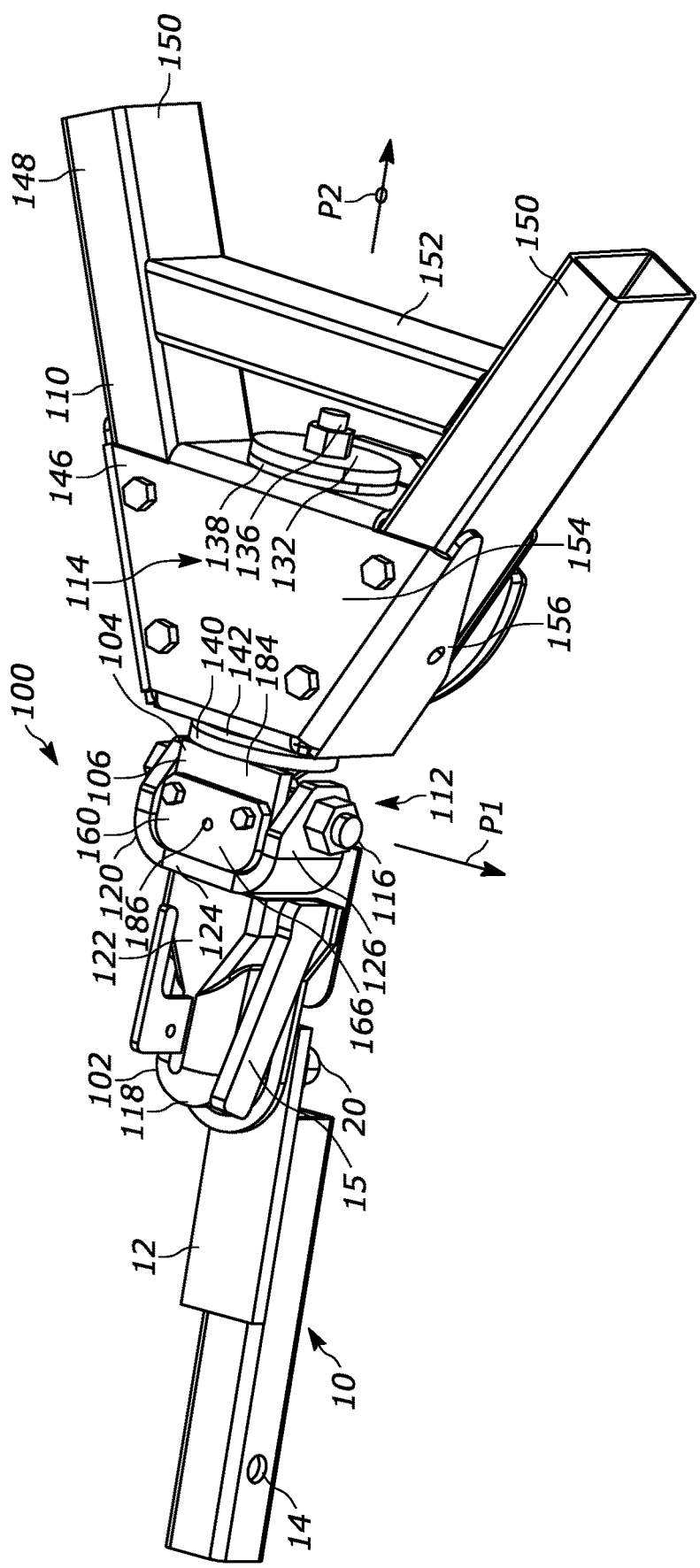
FIG. 1 is a perspective view of a first example trailer coupler assembly having a ball coupler, a first pivot connection having a lock out member coupled thereto, and a second pivot connection in accordance with various embodiments.
Figure 2:
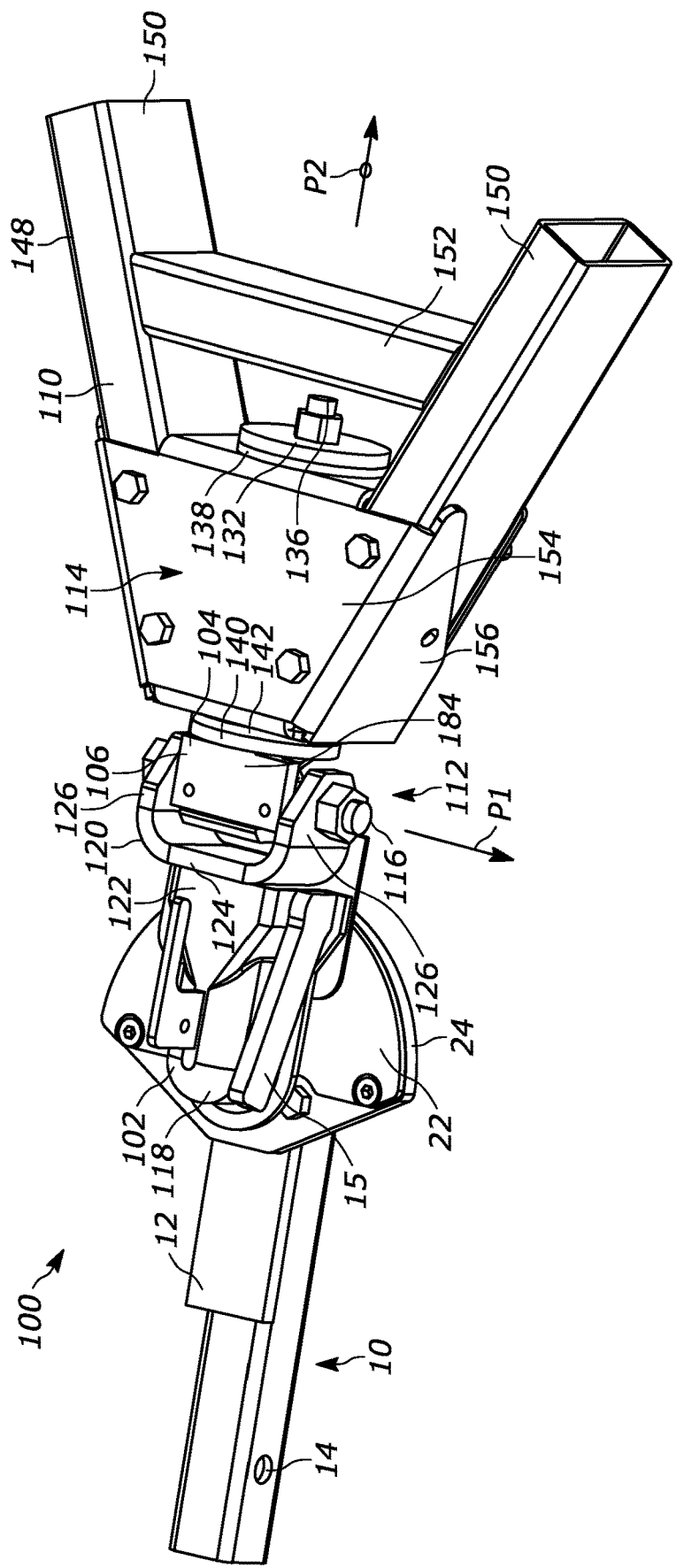
FIG. 2 is a perspective view of the trailer coupler assembly of FIG. 1 showing the first pivot connection without the lock out member.
Figure 3:
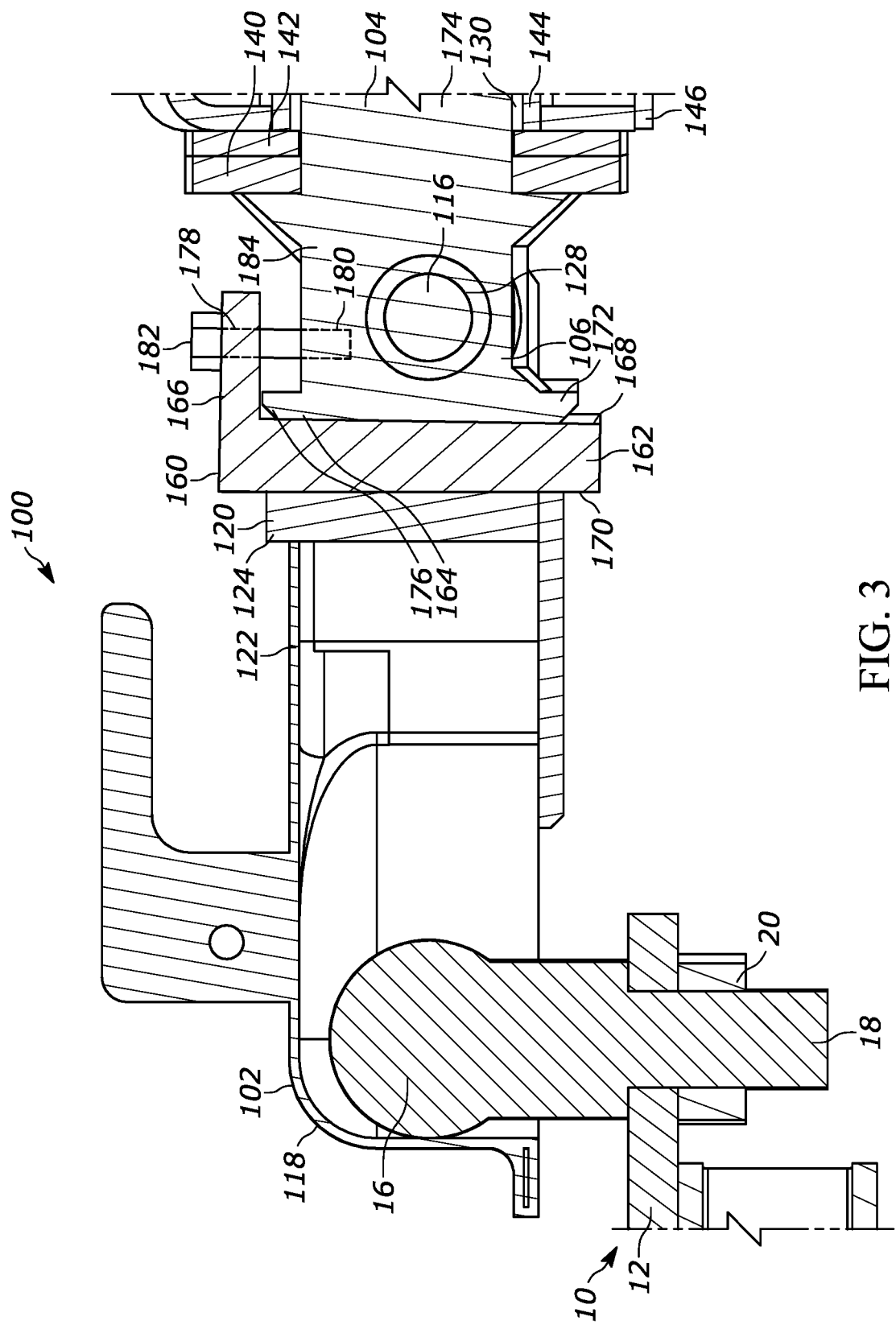
FIG. 3 is a cross-sectional view of the trailer coupler assembly of FIG. 1.
Figure 4:
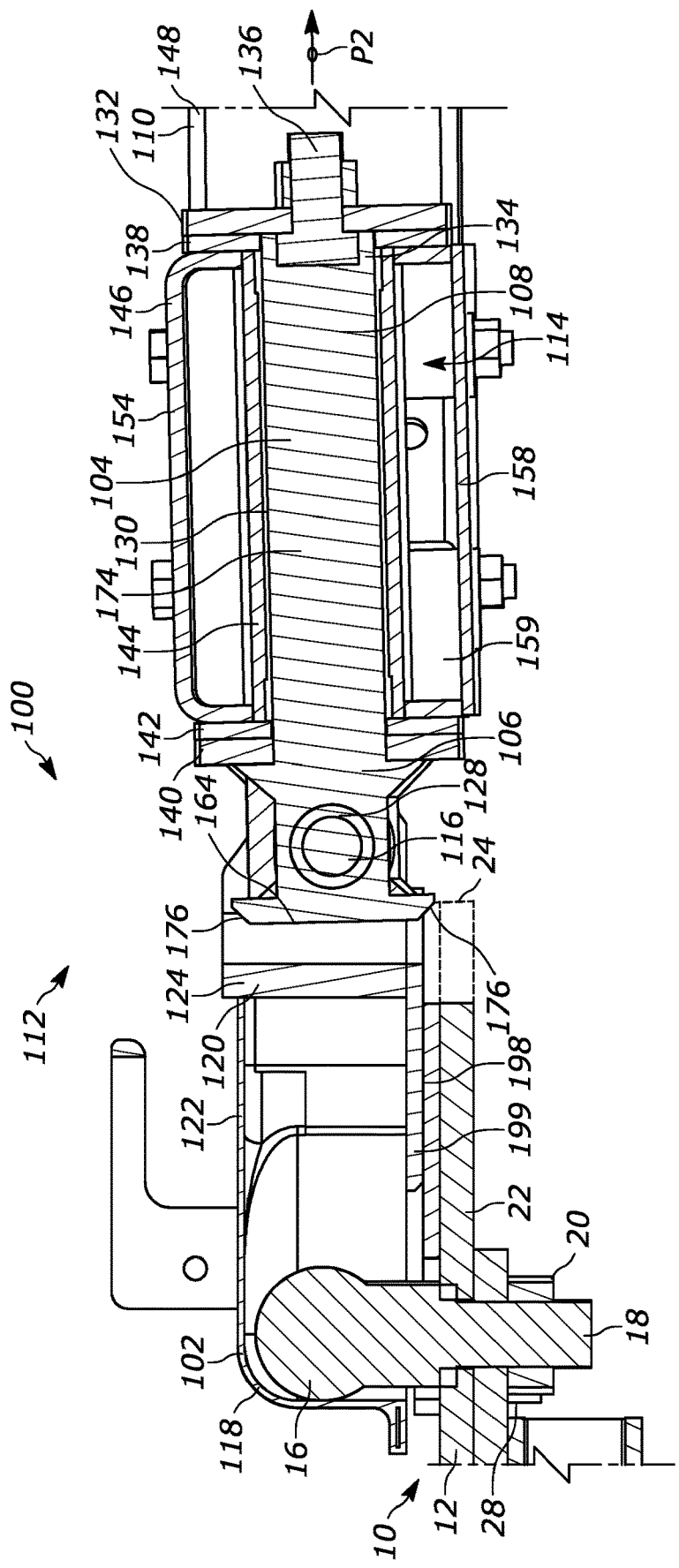
FIG. 4 is a cross-sectional view of the trailer coupler assembly of FIG. 2.
Figure 5:
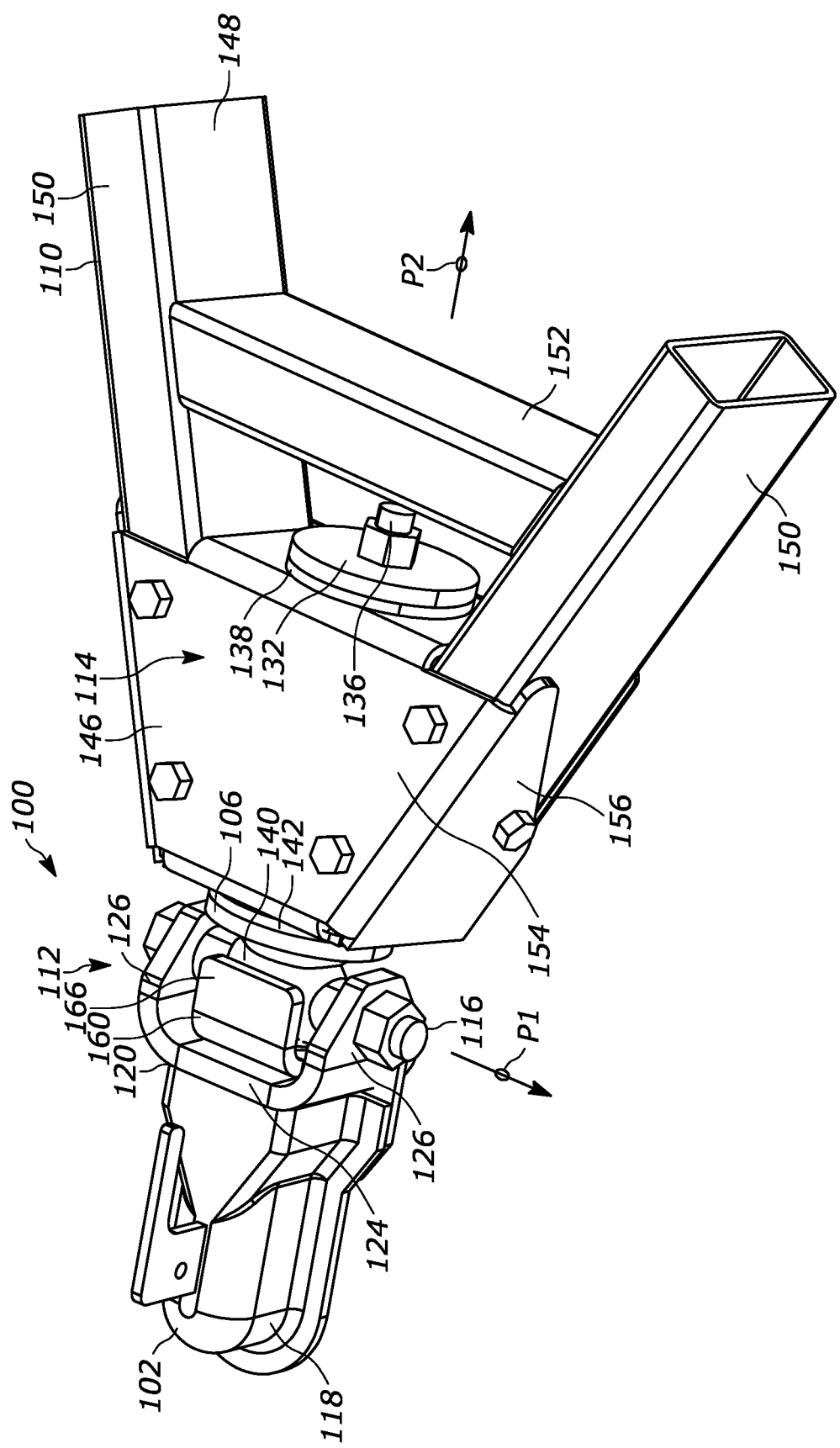
FIG. 5 is a perspective view of a second example trailer coupler assembly having a ball coupler, a first pivot connection having a lock out member coupled thereto, and a second pivot connection in accordance with various embodiments.
Figure 6:
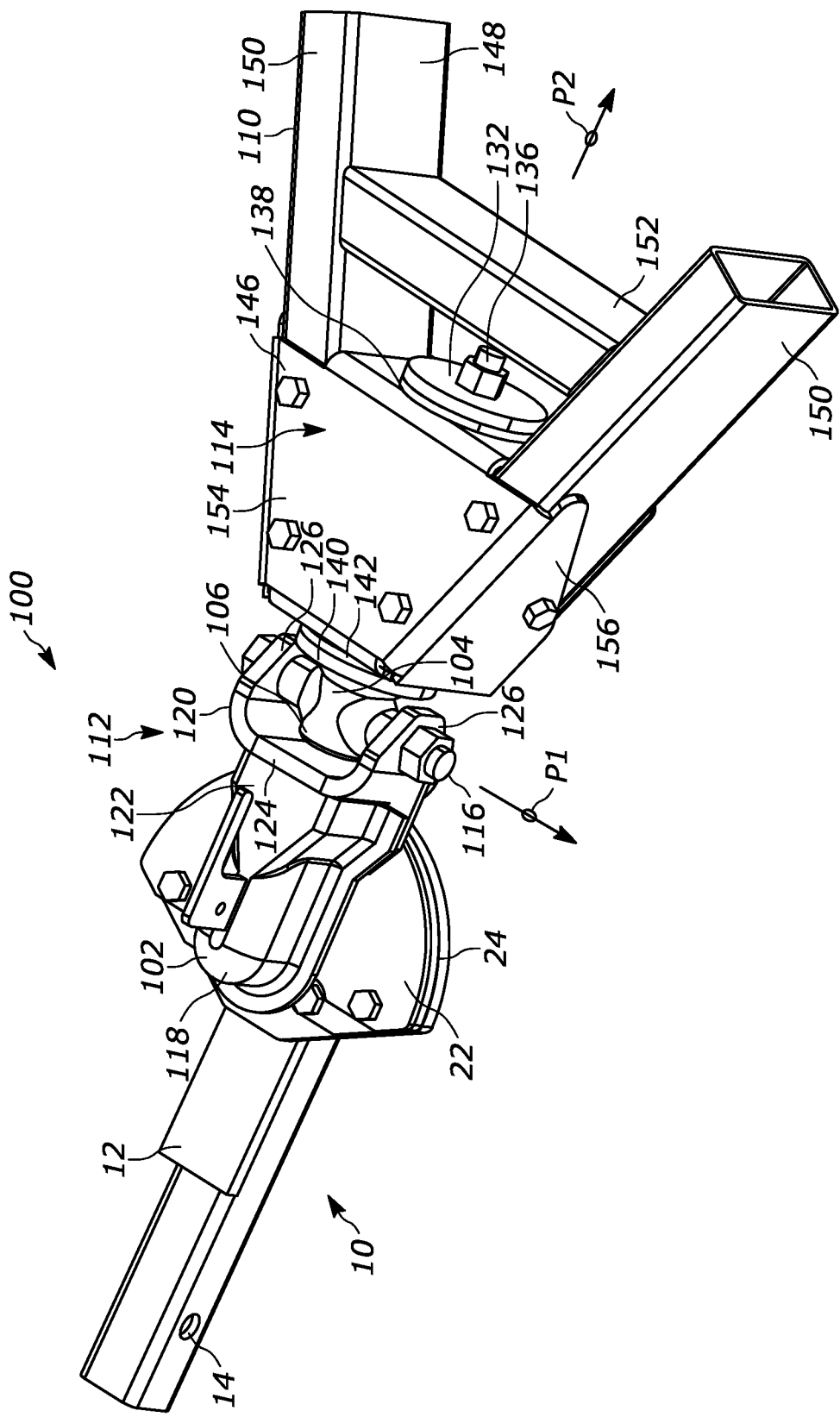
FIG. 6 is a perspective view of the trailer coupler assembly of FIG. 5 showing the first pivot connection without the lock out member.
Figure 7:
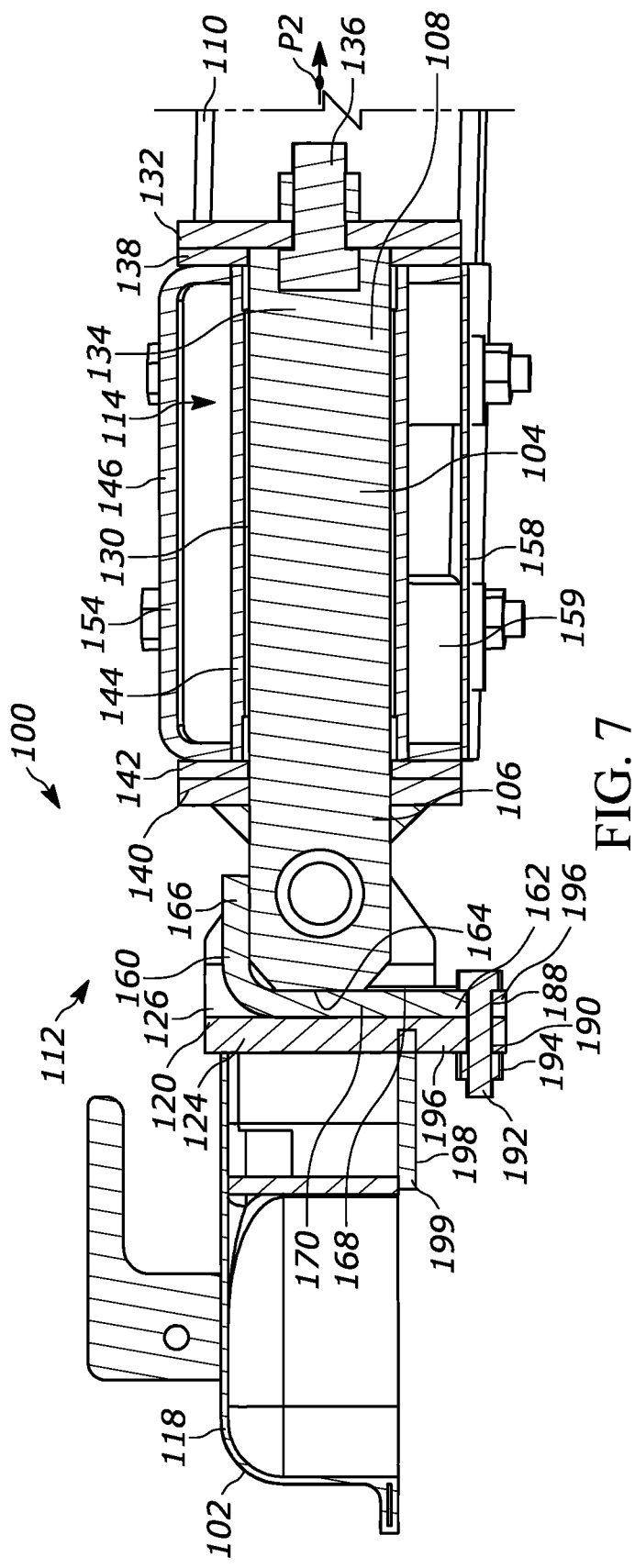
FIG. 7 is a cross-sectional view of the trailer coupler assembly of FIG. 5.
Figure 8:
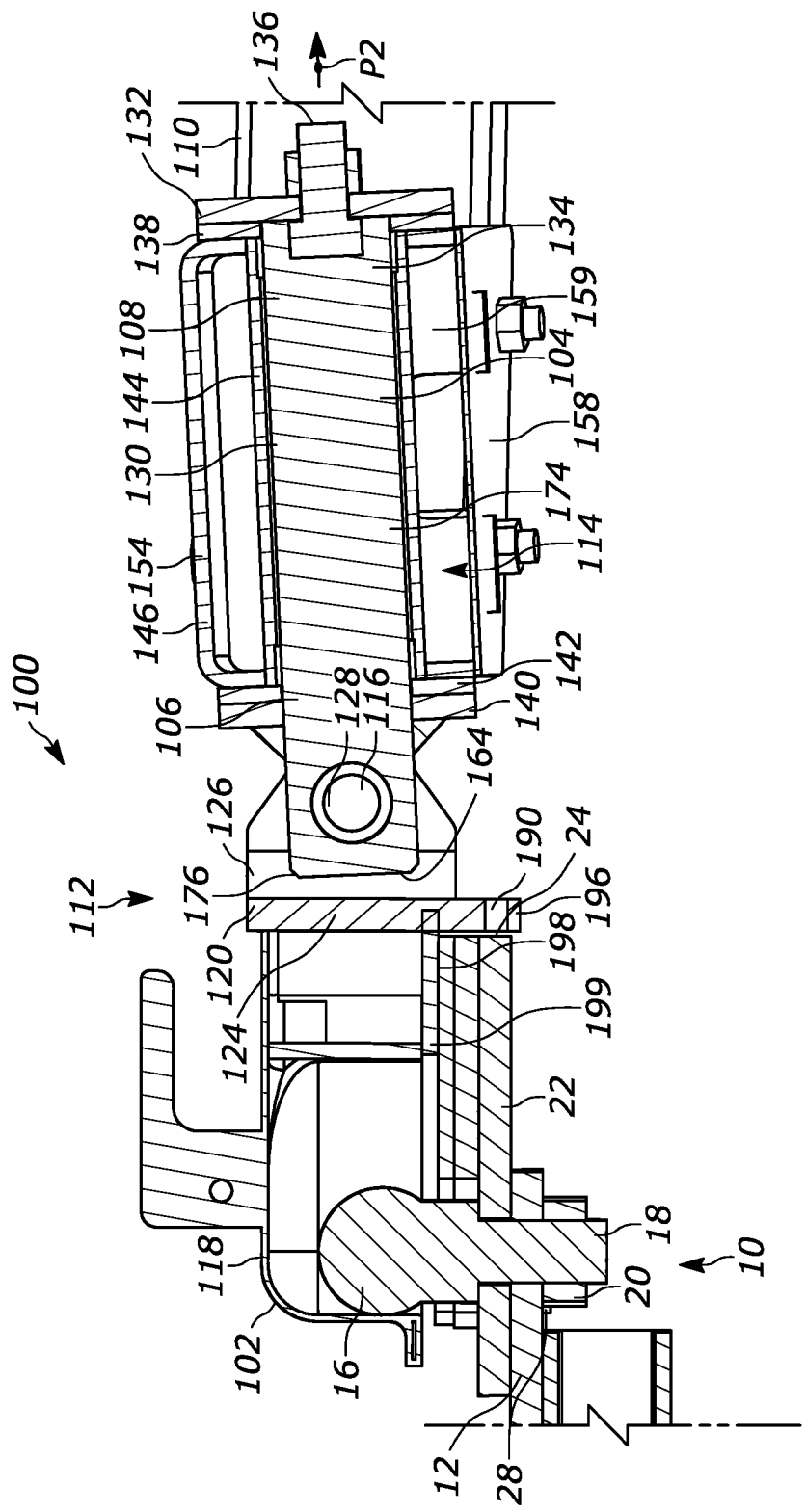
FIG. 8 is a cross-sectional view of the trailer coupler assembly of FIG. 6.
Figure 9:
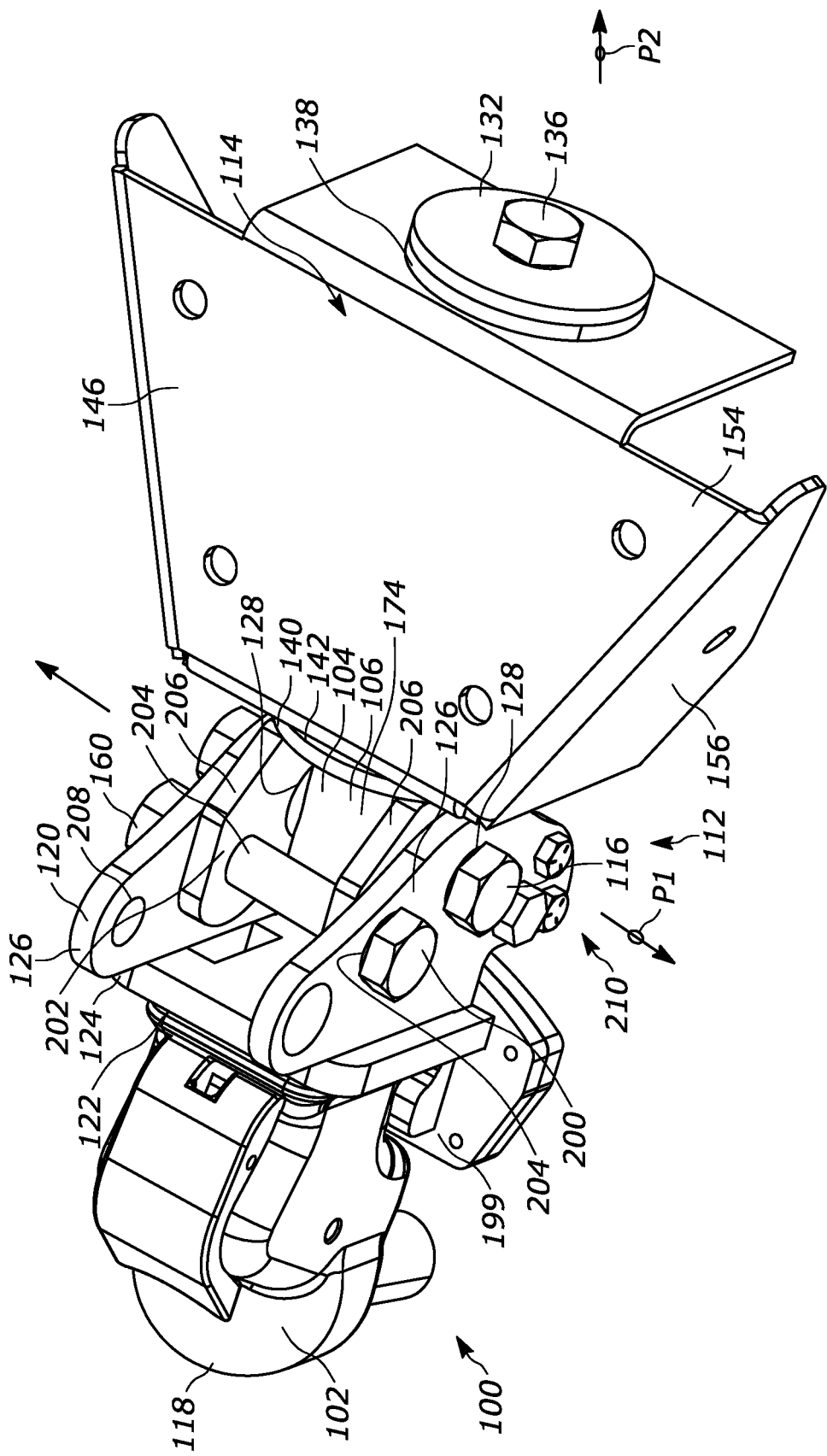
FIG. 9 is a perspective view of a third example trailer coupler assembly having a ball coupler, a first pivot connection having a lock out member coupled thereto, and a second pivot connection in accordance with various embodiments.

In a second example form as shown in FIGS. 5-8, the lock out member 160 can be configured to secure to the ball coupler 102. For example, the lock wall 162 and the bracket rear wall 124 can include bores 188, 190 that are configured to align with the lock out member 160 engaging the first pivot connection 112 and a fastener 192 can be inserted therethrough. The bores 188, 190 can be threaded and/or a nut 194 or other securing member can be coupled to the fastener 192 to retain the fastener 192 within the bores 188, 190. As shown in FIG. 8, the bores 188, 190 can extend through downwardly depending portions or projections 196 of the lock wall 162 and bracket rear wall 124 that extend below the first pivot connection 112.

In another form, as shown in FIGS. 9-12, the lock out member 160 is a lock bar 200 that can be selectively inserted through a portion of the ball coupler 102 and a portion 202 of the rod member first end 106 to restrict movement of the components relative to one another about the horizontal pivot axis P1. For example, as shown, bores 204 extending through the bracket side walls 126 and the portion 202 of the rod member 104 can be aligned when the ball coupler 102 and rod member 104 disposed in a desired orientation relative to one another, such as generally horizontal, e.g., with the trailer assembly 100 aligned along a plane, and the lock bar 200 can be inserted therethrough. The lock bar 200 can have any suitable configuration. For example, the lock bar 200 can be a bolt and secured in the bores 204 with a nut. Of course other securing mechanisms can be utilized, such as a cotter pin, clamp, etc.

The bore(s) 204 can extend through any desired portion of the rod member 104. For example, the bore 204 can extend through the cylindrical main portion 174 of the rod member 104 adjacent to the bore 128 for the pin 116. In another example, the rod member 104 can include one or more walls 206 extending away from the cylindrical main portion 174 of the rod member 104 and disposed between the bracket side walls 126. In the example shown in FIGS. 9 and 10, the rod member 104 includes two walls 206 disposed on either side of the cylindrical main portion 174 thereof to extend along the bracket side walls 126. Of course, other suitable configurations could be utilized, such as a plurality of walls inwardly spaced from the bracket side walls 126, one or more additional intermediary walls, a single wall extending upwardly, forwardly, and/or downwardly of the cylindrical body 109, and so forth.

In order to convert the trailer coupler assembly 100 to the second mode of operation, the lock out member 160 can be removed from the first pivot connection 112 to thereby allow rotation of the rod member 104 relative to the ball coupler 102 about the pivot axis P1. Further, vertical movement of the ball coupler 102 relative to the ball hitch 10 can be restricted, such that the assembly 100 is only able to freely pivot about the pivot axis P1 of the first pivot connection 112, to freely pivot about the pivot axis P2 of the second pivot connection, and pivot within a horizontal plane about the ball hitch 10.

In one form as shown in FIGS. 2, 4, 6, 8, 10, 12, and 13, to achieve this movement restriction, a restrictor plate 22 can be removably coupled to the mount 12 below and/or rearwardly of the ball hitch 10 to thereby engage a bottom edge 198 of the ball coupler 102 when the ball coupler 102 is mounted to the ball hitch 10. With this configuration, the ball coupler 102 is able to slide along the restriction plate 22 to pivot within a horizontal plane, but is restricted from moving vertically relative to the ball hitch 10. The restrictor plate 22 can have a one-piece construction or can include a variety of layers, including a plastic or other low friction layer, as desired. Additionally, the bottom edge 198 of the ball coupler 102 can be provided by an engagement plate 199 coupled to or integral with the bottom of the ball coupler 102. In the illustrated form, the restrictor plate 22 includes an opening 26 through which the shaft 18 of the of the ball hitch 10 extends. Further, to restrict rotation of the restrictor plate 22 relative to other components of the ball hitch 10, the restrictor plate 22 can include stop members 28 (FIG. 13), such as bolts as shown, that depend downwardly therefrom on either side of the mount 12 or couple to the mount 12.

In the form of FIGS. 1-4, the restrictor plate 22 can be sized as shown in broken lines to extend past the rear wall 124 of the ball coupler 102 to at least partially form a bottom for the space between the rear wall 124 and the end surface 164 of the rod member 104. Advantageously, the lock wall 162 can be sized to extend past the bottom of the rear wall 124 when fully inserted into the first pivot connection 112. With this configuration, when the restrictor plate 22 is installed to the ball hitch 10, the restrictor plate 22 can prevent the lock wall 162 from being fully inserted into the first pivot connection 112. This can be utilized to prevent a user from restricting movement of the first pivot connection 112 and of the ball coupler 102 at the same time.

In the form of FIGS. 5-8 where the lock out member 160 is configured to be secured to the ball coupler 102 by the fastener 192 being inserted through the bores 188, 190, the bores 188, 190 can be aligned with the restrictor plate 22. With this configuration, the restrictor plate 22 can be sized to prevent the fastener 192 from being able to be inserted through the bores 188, 190 to secure the lock out member 160 to the ball coupler 102. This prevents a user from inadvertently restricting movement of both the ball coupler 102/ball hitch 10 coupling and the first pivot connection 112 at the same time. For example, a rear edge 24 of the restrictor plate 22 can have a curvature complementary to an arc of rotation of the projection 196 of the bracket rear wall 124, such that the projection 124 shifts along or adjacent to the rear edge 24 as the ball coupler 102 pivots about the ball hitch 10.

In the form of FIGS. 9-12, the trailer coupler assembly 100 can include a storage connector 208 for the lock bar 200 in an area spaced from the first pivot connection 112 to dispose the lock bar 200 when the trailer coupler assembly 100 is in the second mode of operation. In the illustrated form, the bracket sidewalls 126 can include aligned bores 208 spaced from the rod member 104, e.g., in a top portion thereof. In another example, a single bore, a clip, a clamp, a snap-fit connection, or the like can be provided on any desired portion of the trailer coupler assembly 100 to store the lock bar 200. In use, a user can remove a nut or other securing mechanism from the lock bar 200 and remove the lock bar 200 from the bores 204 to thereby free the rod member 104 and ball coupler 102 to pivot with respect to one another about the horizontal pivot axis P1. The user can then insert the lock bar 200 into the storage bores 208 and reattach the nut or other securing mechanism.

In some instances, e.g., a sudden stop or deceleration while traveling at a high rate of speed, the forward momentum of the trailer can cause the trailer coupler assembly 100 to rotate upwardly relative to the ball hitch 10 when the trailer coupler assembly 100 is in the second mode of operation. In one example, the ball coupler 102 can include a latch mechanism 210 to selectively engage the restrictor plate 22 when the assembly 100 is in the second mode of operation to restrict upward rotation of the assembly 100 relative to the restrictor plate 22. In the illustrated example, the ball coupler 102 includes a pivotable latch member 212 movable between a storage position (FIG. 11) and a use position (FIG. 12) where a lower wall 214 of the latch member 212 is positioned below the restrictor plate 22. Pursuant to this, the ball coupler 102 can include a pivot pin 216 extending between the side walls 126 about which the latch member 212 can rotate.

Figure 10:
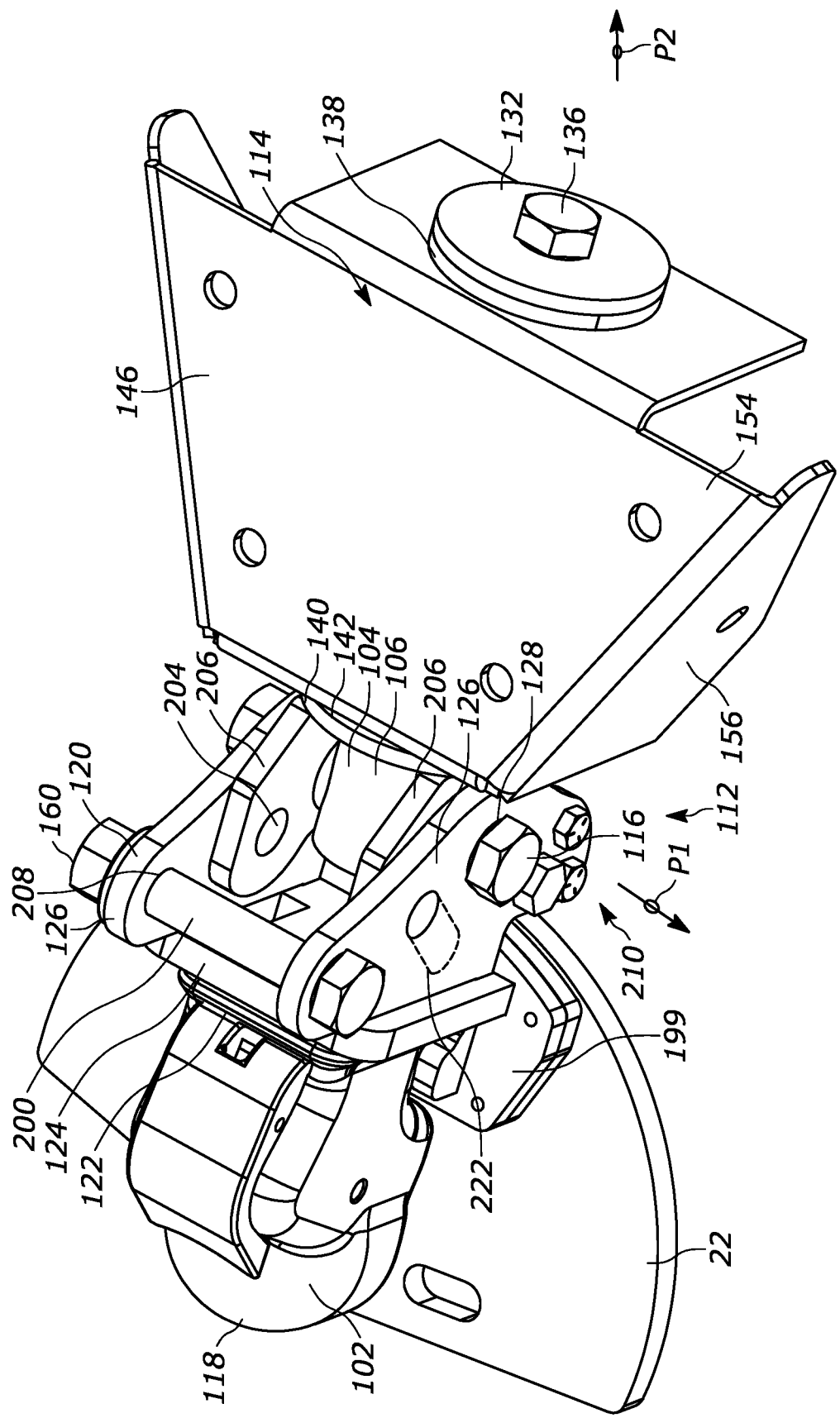
FIG. 10 is a perspective view of the trailer coupler assembly of FIG. 9 showing the first pivot connection without the lock out member.
Figure 11:
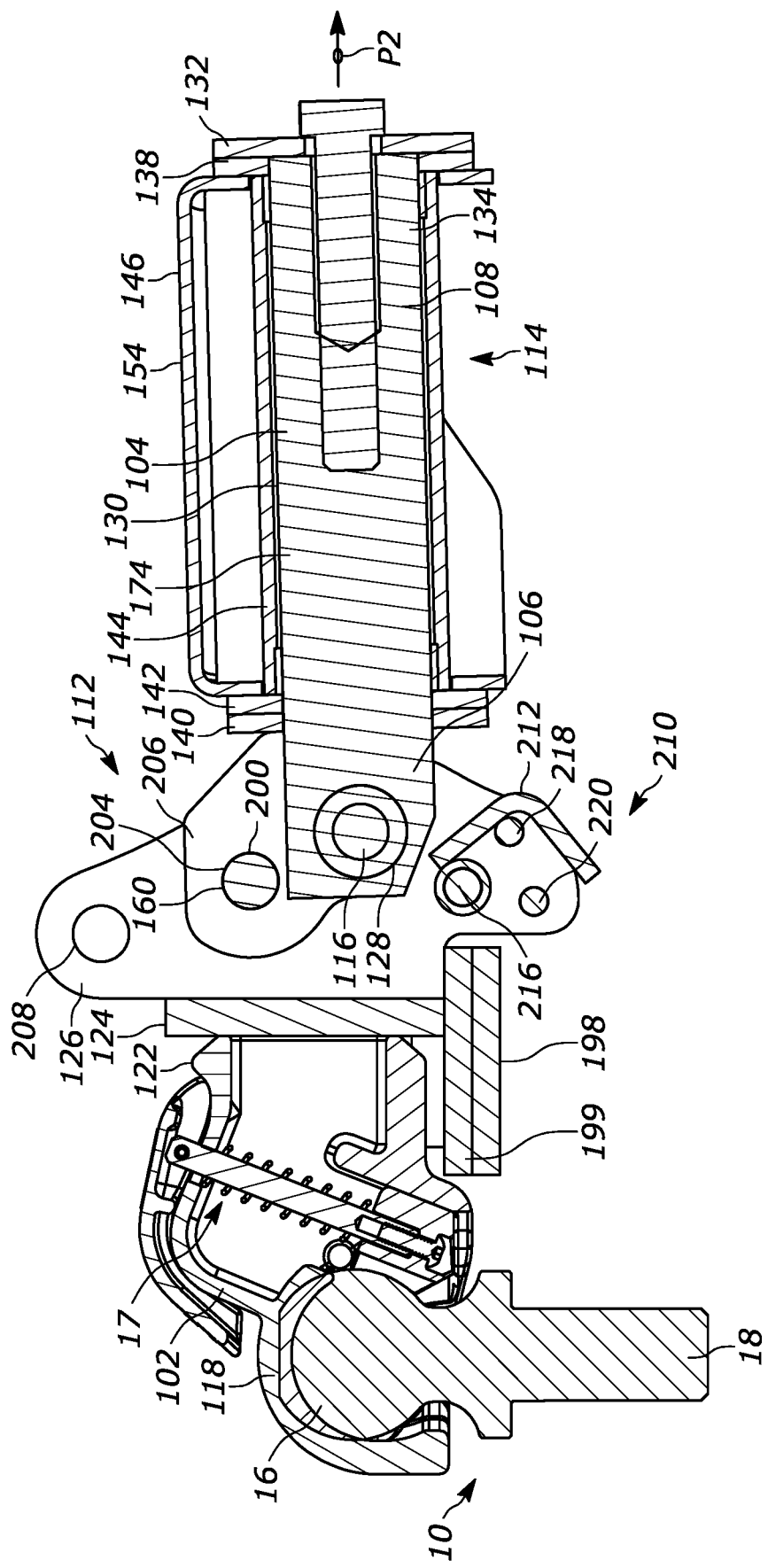
FIG. 11 is a cross-sectional view of the trailer coupler assembly of FIG. 9.
Figure 12:
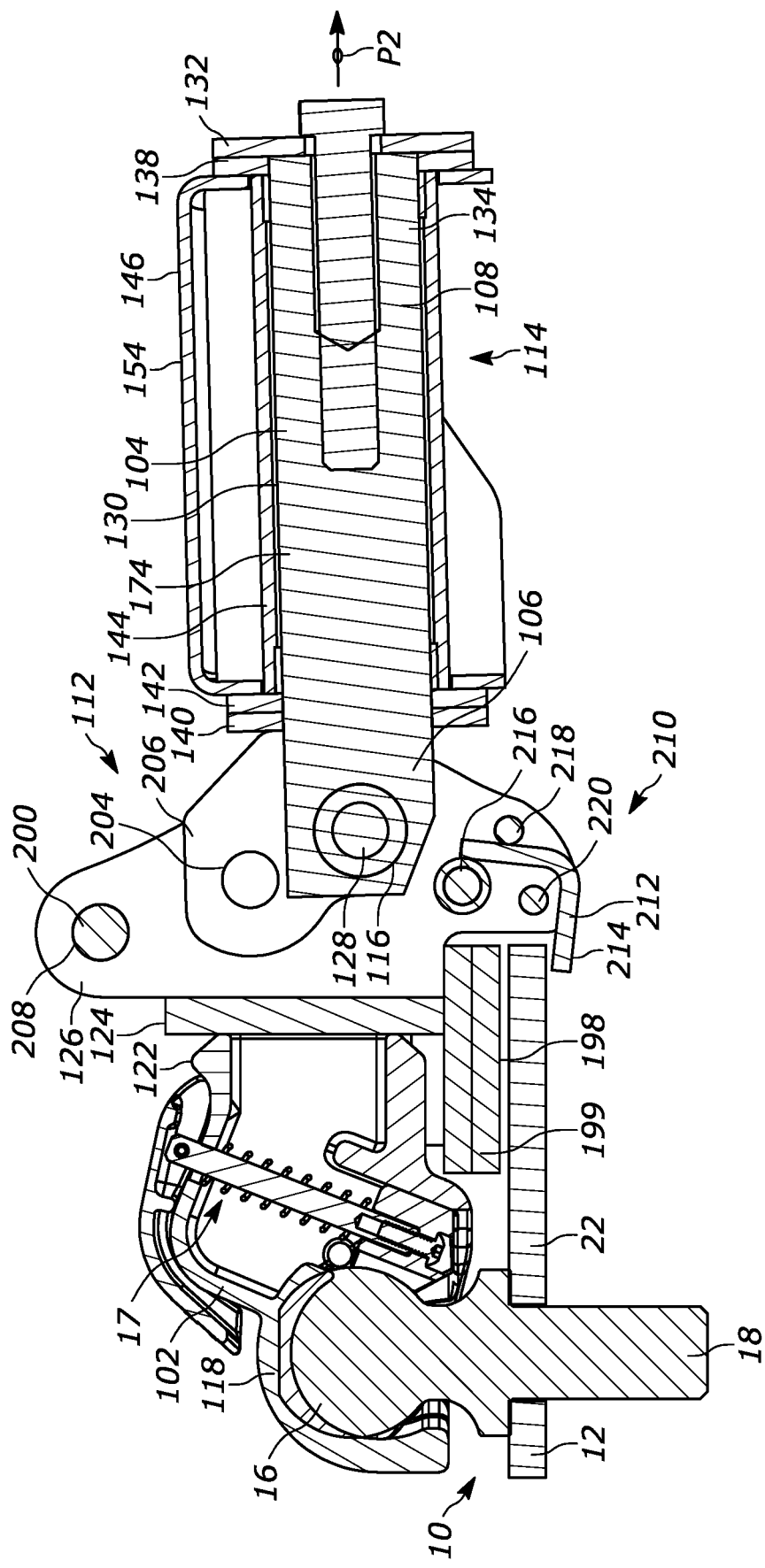
FIG. 12 is a cross-sectional view of the trailer coupler assembly of FIG. 10.

As shown in FIGS. 11 and 12, the ball coupler 102 can further include a stop 218 that can selectively engage the latch member 212 to hold the latch member 212 in the storage position. When the trailer coupler assembly 100 is converted to the second mode of operation and the lock bar 200 is removed from the first pivot connection 112, the stop 218 can be moved out of the way of the latch member 212 and the latch member 212 can be pivoted so that the lower wall 214 is disposed below the restrictor plate 22. Thereafter, the stop 218 can be moved back into position to restrict rearward rotation of the latch member 212, effectively holding the latch member 214 in the use position. In the illustrated example, the stop 218 is a bolt or other rod that can be selectively secured within aligned bores in the bracket side walls 126. If desired, the ball coupler 102 can include a second stop 220 disposed forwardly of the first stop 218 and configured to prevent the latch member 212 from pivoting forwardly too far in the use position. Although the latch mechanism 210 is shown with regard to the example trailer coupler assembly 100 of FIGS. 9-12, it will be understood that the latch mechanism 210 can be included with the other disclosed examples.

In another example, as shown in FIG. 10, the ball coupler 102 can include a slot opening 222 in the bracket side walls 126 rather than the bores 128 discussed above. The slot opening 222 can have an arced configuration to provide room for some rotation of the rod member 104 relative to the ball coupler 102, as the pin 116 can slide therein. Allowing the rod member 104 to slightly rotate can alleviate the lever arm action that may occur between the ball hitch 10 and the trailer coupler assembly 100 discussed above.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A trailer coupler assembly comprising:
   a ball coupler;
   a rod member having a first end and an opposite second end;
   a trailer frame;
   a first pivot connection pivotably connecting the first end of the rod member to the ball coupler, such that the rod member can rotate within a vertical plane relative to the ball coupler;
   a second pivot connection pivotably connecting the rod member to the trailer frame, such the trailer frame can rotate around the rod member; and
   a lock out member configured to releasably engage the first pivot connection to thereby restrict pivoting of the rod member relative to the ball coupler.

2. The trailer coupler assembly of claim 1, wherein the ball coupler further comprises a rear wall and side walls extending away from edges of the rear wall, and the first pivot connection comprises a pin extending between the side walls and through the first end of the rod member.

3. The trailer coupler assembly of claim 2, wherein the lock out member comprises a lock bar configured to be selectively inserted through the side walls of the ball coupler and the first end of the rod member.

4. The trailer coupler assembly of claim 3, wherein the lock bar comprises a bolt and nut configured to be selectively inserted through aligned bores of the side walls of the ball coupler and the first end of the rod member.

5. The trailer coupler assembly of claim 3, wherein the rod member comprises a cylindrical body; and the first end of the rod member comprises one or more walls extending outwardly from the cylindrical body, the lock bar configured to be selectively inserted through the side walls of the ball coupler and the one or more walls of the first end of the rod member.

6. The trailer coupler assembly of claim 5, wherein the one or more walls comprise two walls disposed on opposite sides of the cylindrical body of the rod member.

7. The trailer coupler assembly of claim 3, wherein the side walls of the ball coupler define a slot opening therein, the lock bar configured to shift within the slot opening to allow the rod member to pivot relative to the ball coupler about the first pivot connection.

8. The trailer coupler assembly of claim 3, wherein the ball coupler further comprises a storage connector for the lock bar when not engaged in the first pivot connection.

9. The trailer coupler assembly of claim 3, further comprising:
   a mount;
   a ball hitch coupled to the mount; and
   a restrictor plate configured to be removably coupled to the mount below the ball hitch when the lock bar is not engaged in the first pivot connection, the restrictor plate configured to restrict vertical movement of the ball coupler relative to the ball hitch when the ball coupler is coupled thereto.

10. The trailer coupler assembly of claim 9, wherein the ball coupler further comprises a latch mechanism configured to selectively be disposed below a bottom surface of the restrictor plate when the lock bar is not engaged in the first pivot connection to thereby restrict upward rotation of the ball coupler relative to the restrictor plate.

11. The trailer coupler assembly of claim 10, wherein the latch mechanism comprises a latch member pivotably mounted between the side walls of the ball coupler.

12. The trailer coupler assembly of claim 2, wherein the lock out member comprises a lock wall configured to be removably inserted between an end surface of the first end of the rod member and the rear wall of the ball coupler.

13. The trailer coupler assembly of claim 12, wherein the lock wall has a tapered configuration to be press fit between the end surface of the first end of the rod member and the rear wall of the ball coupler.

14. The trailer coupler assembly of claim 12, wherein a top edge of the first end of the rod member has a beveled configuration.

15. The trailer coupler assembly of claim 14, wherein an end portion of the first end of the rod member has a rectangular configuration.

16. The trailer coupler assembly of claim 12, wherein the lock out member further comprises a top wall extending transversely from the lock wall to be disposed over the rod member when the lock out member releasably engages the first pivot connection.

17. The trailer coupler assembly of claim 16, wherein the top wall and the rod member include bores configured to align with the lock out member engaging the first pivot connection; and further comprising a fastener configured to be threaded into the bores to thereby secure the lock out member to the rod member.

18. The trailer coupler assembly of claim 17, wherein the top wall further comprises a second bore not aligned with a bore in the rod member, such that inserting a fastener through the second bore causes the wall to release from between the end surface of the first end of the rod member and the rear wall of the ball coupler.

19. The trailer coupler assembly of claim 12, further comprising;
a mount;
a ball hitch coupled to the mount; and
a restrictor plate configured to be removably coupled to the mount below the ball hitch when the lock wall is not engaged in the first pivot connection, the restrictor plate configured to restrict vertical movement of the ball coupler relative to the ball hitch when the ball coupler is coupled thereto.

20. The trailer coupler assembly of claim 19, wherein the rear wall and lock wall include downwardly depending portions having bores extending therethrough, the bores configured to align with the lock out member engaging the first pivot connection and receive a fastener therethrough to secure the lock out member to the rear wall.

21. The trailer coupler assembly of claim 20, wherein the bore of the downwardly depending portion of the rear wall is configured to align with the restrictor plate when the restrictor plate is coupled to the mount and the ball coupler is coupled to the ball hitch, and is sized to prevent the fastener from be inserted through the bores of the downwardly depending portions.

22. The trailer coupler assembly of claim 21, wherein a rear edge of the restrictor plate has a curved configuration complementary to an arc of rotation of the downwardly depending portion of the rear wall.

23. The trailer coupler assembly of claim 1, further comprising a handle coupled to the ball coupler configured to aid in mounting the ball coupler to a ball hitch.

24. A method for operating a trailer coupler assembly including a ball coupler, a trailer frame, and a rod member having a first end pivotably connected to the ball coupler at a first pivot connection allowing the rod member to rotate within a vertical plane relative to the ball coupler and a second end pivotably connected to the trailer frame at a second pivot connection to allow the trailer frame to rotate about the rod member, the method comprising:
coupling the ball coupler to a ball hitch of a towing vehicle; and
engaging the first pivot connection with a lock out member to thereby restrict pivoting of the rod member relative to the ball coupler.

25. The method of claim 24, wherein engaging the first pivot connection with the lock member comprises inserting a lock bar through the ball coupler and the first end of the rod member.

26. The method of claim 24, wherein engaging the first pivot connection with the lock member comprises inserting a lock wall of the lock out member between the rod member and a rear wall of the ball coupler.

27. The method of claim 26, further comprising securing a top wall of the lock out member to the rod member using one or more fasteners.

28. The method of claim 27, further comprising releasing the lock wall from between the rod member and the rear wall of the ball coupler by threading a fastener through a bore of the top wall to abut the rod member.

29. The method of claim 26, further comprising securing the lock wall to the rear wall of the ball coupler with a fastener.

30. The method of claim 24, further comprising:
disengaging the lock out member from the first pivot connection; and
securing a restrictor plate to a mount below a ball hitch coupled thereto, the restrictor plate configured to restrict vertical movement of the ball coupler when the ball coupler is coupled to the ball hitch.

31. The method of claim 30, further comprising disposing a portion of a latch member of the ball coupler below the restrictor plate to thereby restrict upward rotation of the ball coupler relative to the restrictor plate.

\* \* \* \* \*